US009132350B2

(12) United States Patent
Kim et al.

(10) Patent No.: US 9,132,350 B2
(45) Date of Patent: Sep. 15, 2015

(54) PLAYER MATCHING IN A GAME SYSTEM

(75) Inventors: Seungil Kim, Seoul (KR); Youngil Ko, Seoul (KR)

(73) Assignee: EMPIRE TECHNOLOGY DEVELOPMENT LLC, Wilmington, DE (US)

( * ) Notice: Subject to any disclaimer, the term of this patent is extended or adjusted under 35 U.S.C. 154(b) by 52 days.

(21) Appl. No.: 13/697,243

(22) PCT Filed: Feb. 14, 2012

(86) PCT No.: PCT/US2012/025007
§ 371 (c)(1),
(2), (4) Date: Nov. 9, 2012

(87) PCT Pub. No.: WO2013/122574
PCT Pub. Date: Aug. 22, 2013

(65) Prior Publication Data
US 2013/0210527 A1    Aug. 15, 2013

(51) Int. Cl.
*G06F 17/00* (2006.01)
*A63F 13/30* (2014.01)
(52) U.S. Cl.
CPC .......... *A63F 13/12* (2013.01); *A63F 2300/535* (2013.01); *A63F 2300/5566* (2013.01)
(58) Field of Classification Search
USPC .......................................... 463/16–19, 39–43
See application file for complete search history.

(56) References Cited

U.S. PATENT DOCUMENTS

| 6,725,107 | B2 * | 4/2004 | MacPherson | 700/92 |
| 8,239,048 | B2 * | 8/2012 | Kim et al. | 700/91 |
| 2006/0003824 | A1 | 1/2006 | Kobayashi et al. | |
| 2007/0087834 | A1 * | 4/2007 | Moser et al. | 463/42 |
| 2007/0149290 | A1 | 6/2007 | Nickell et al. | |
| 2008/0039165 | A1 | 2/2008 | Harris et al. | |
| 2010/0069156 | A1 | 3/2010 | Riego | |
| 2011/0106736 | A1 | 5/2011 | Aharonson et al. | |

FOREIGN PATENT DOCUMENTS

| GB | 2471768 | 1/2011 |
| KR | 10-0542084 B1 | 1/2006 |
| KR | 1020060043334 A | 5/2006 |
| WO | 2011041516 | 4/2011 |

OTHER PUBLICATIONS

Best IOS/iPhone Multiplayer Games in 2011, http://www.product-reviews.net/2011/01/20/best-ios-iphone-multipl by Tina Chubb.
Simraceway Announces Dan Wheldon, http://blog.simraceway.com/2011/08/simraceway-announces-dah-wh By Jonathan Haswell.
International Search Report & Written Opinion from International Application No. PCT/US2012/025007, mailed May 29, 2012.

* cited by examiner

*Primary Examiner* — Ronald Laneau
(74) *Attorney, Agent, or Firm* — Brundidge & Stanger, P.C.

(57) ABSTRACT

Technologies are generally described for a player matching scheme for a game system. In some examples, a player matching system may include an access pattern analysis unit configured to analyze access patterns of a plurality of players of a game provided by a game server, and a player recommendation unit configured to recommend to one player of the plurality of players at least some others of the plurality of players with whom the one player can compatibly play the game, based at least in part on the analyzed access patterns.

19 Claims, 6 Drawing Sheets

PLAYER MATCHING IN A GAME SYSTEM

CROSS-REFERENCE TO RELATED APPLICATION

This Application is a U.S. National Stage Application under 35 USC §371 claiming the benefit of International Application No. PCT/US12/25007, filed on Feb. 14, 2012.

BACKGROUND

The birth of cloud computing technology and the dissemination of high-end mobile devices such as smartphones and tablets have been attracting users to enjoy online games, such as a role playing game (RPG), with their devices. The users tend to play online games wherever and whenever they want.

A massively multiplayer online role playing game (MMORPG) is a type of role playing games in which a large number of players make their own characters and for gaming purposes. In the MMORPG, many players may form a guild to play a game together in the long term or a group of players may temporarily form a party to achieve a short-term goal. Thus, it may be important for a player of the MMORPG to find other players with whom he/she can compatibly play the game.

SUMMARY

In an example, a player matching system may include an access pattern analysis unit configured to analyze access patterns of multiple players of a game provided by a game server, and a player recommendation unit configured to recommend to one player of the multiple players at least some others of the multiple players with whom the one player can compatibly play the game, based at least in part on the analyzed access patterns.

In another example, a method performed under control of a game server may include analyzing an access pattern of a player playing a game provided by the game server, and recommending to the player one or more other compatible players with whom to play the game, based at least in part on the access pattern of the player and access patterns of the one or more other players.

In yet another example, a computer-readable storage medium may store thereon computer-executable instructions that, in response to execution, cause a player matching system to perform operations, including analyzing access log data of multiple players of a game provided by a game server, and recommending to one player of the multiple players at least some of the other players having access patterns that are similar to an access pattern of the one player.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE FIGURES

The foregoing and other features of this disclosure will become more apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings, in which:

DETAILED DESCRIPTION

Figure 1:
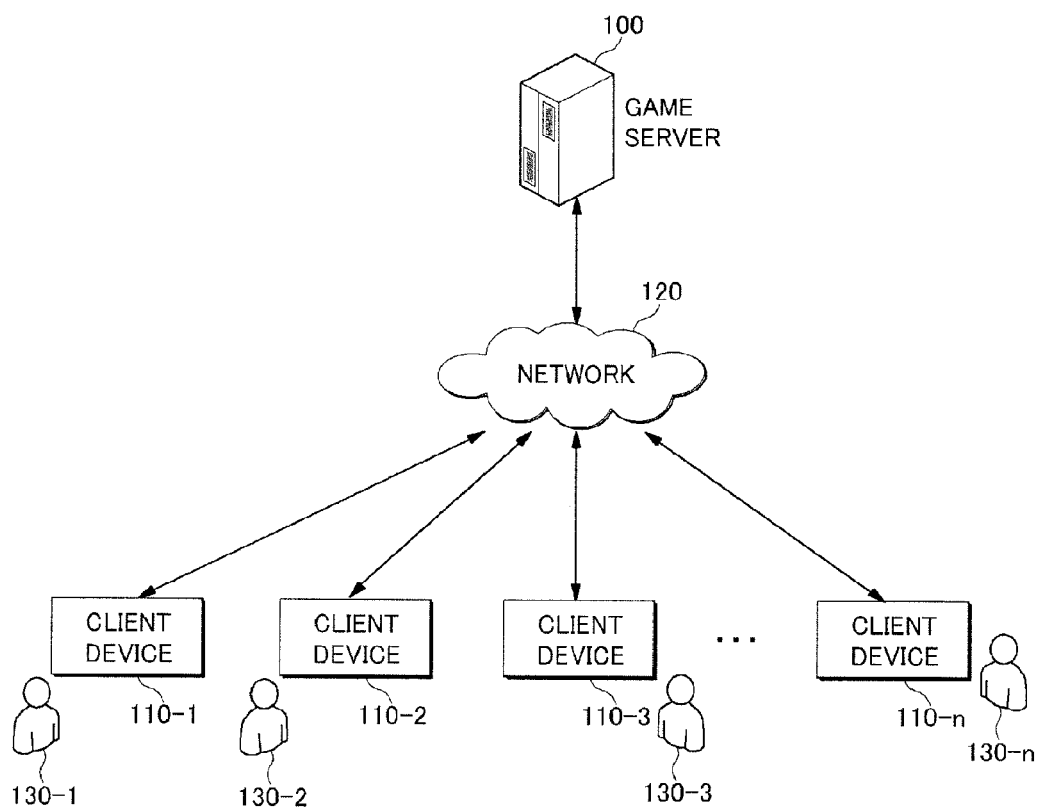
FIG. 1 schematically shows an illustrative example of a game system in which multiple client devices are connected to a game server providing a game service over a network, arranged in accordance with at least some embodiments described herein.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the drawings, can be arranged, substituted, combined, separated, and designed in a wide variety of different configurations, all of which are explicitly contemplated herein.

This disclosure is generally drawn, inter alia, to methods, apparatuses, systems, devices, and computer program products related to a player matching scheme for a game system.

Technologies are generally described for a game system in which a game server provides a game service to multiple players over a network. In some examples, a player matching system, which may be a component of the game server or separate from the game server but controlled by the game server, may analyze an access pattern of a player playing a game provided by the game server, and recommend to the player one or more other compatible players with whom to play the game, based at least in part on the access pattern of the player and access patterns of the one or more other compatible players.

In some examples, the player matching system may recommend to the player one or more other compatible players with whom to play the game in the long term (i.e., a "long-term player matching"). For the long-term player matching, the player matching system may find a group of players who can continue playing a game for several months or years as a member of a guild within the game. In such cases, the player matching system may recommend to the player the one or more other compatible players in order of similarity between the access pattern of the player and the access pattern of each of the one or more other compatible players.

In some examples, the player matching system may recommend to the player one or more other compatible players with whom to play the game in the short term (i.e., a "short-term player matching"). For the short-term player matching, the player matching system may allow the player to find one or more other players with whom the player can form a party for, e.g., 1 or 2 hours or so in order to solve a game-related quest together. In such cases, the player matching system may calculate an estimate of remaining playing time for the player from the time of receiving a one-time matching request from the player, and calculate each estimate of remaining playing time for each of the one or more other compatible players accessing the game server from the time of receiving the one-time matching request, based at least in part on the access patterns of the player and the one or more other players. Then, the player matching system may recommend to the player the one or more other compatible players in order of similarity between the estimate of remaining playing time for the player and the estimates of remaining playing times for the one or more other compatible players.

FIG. 1 schematically shows an illustrative example of a game system in which multiple client devices are connected to a game server providing a game service over a network, arranged in accordance with at least some embodiments described herein.

As depicted in FIG. 1, a game server 100 may provide a game service, including a cloud-based game service, to multiple client devices 110-1, 110-2, 110-3, ..., 110-$n$ over a network 120. Players 130-1, 130-2, 130-3, ..., 130-$n$ may access game server 100 to play a game provided by game server 100 with their respective client devices 110-1, 110-2, 110-3, ..., 110-$n$. Examples of client devices 110-1, 110-2, 110-3, ..., 110-$n$ may include, but are not limited to, a mobile phone, a smartphone, a personal digital assistant (PDA), a tablet, a mobile game console, a laptop computer, a desktop computer, or any other devices having communication capability, relative to other devices including, e.g., game server 100.

In some embodiments, game server 100 may analyze access patterns of players 130-1, 130-2, 130-3, ..., 130-$n$. By way of example, but not limitation, the access pattern of a player may include at least one of the times at which the player accesses game server 100 and the lengths of time for which the player accesses game server 100. In some embodiments, game server 100 may analyze the access patterns of players 130-1, 130-2, 130-3, ..., 130-$n$ based at least in part on access log data for players 130-1, 130-2, 130-3, ..., 130$n$.

In some embodiments, game server 100 may determine an attribute for each of players 130-1, 130-2, 130-3, ..., 130-$n$ and for each of a predetermined number of time slots, based at least in part on which of the predetermined number of time slots each of players 130-1, 130-2, 130-3, ..., 130-$n$ accesses the game server. The attribute for each of players 130-1, 130-2, 130-3, ..., 130-$n$ and for each of the predetermined number of time slots may be either on-line or off-line.

By way of example, but not limitation, it may be assumed that one day (i.e., 24 hours) is divided into 48 time slots, i.e., the length of each time slot is 30 minutes. In such cases, game server 100 may determine, for each of players 130-1, 130-2, 130-3, ..., 130-$n$, whether the corresponding player has accessed game server 100 in each of the time slots.

In some embodiments, game server 100 may determine the attribute as on-line if the corresponding player accesses game server 100 longer than a predetermined portion of the length of the time slot; and game server 100 may determine the attribute as off-line otherwise. By way of example, but not limitation, when the length of each of the apportioned time slots is 30 minutes, game server 100 may determine the attribute as on-line if the corresponding player accesses game server 100 for longer than, for example, 15 minutes, 18 minutes, or 20 minutes, etc., while as off-line otherwise.

In some embodiments, game server 100 may calculate, for each of players 130-1, 130-2, 130-3, ..., 130-$n$ and for each of the predetermined number of time slots, a quantity of predetermined days having an on-line attribute. Then, game server 100 may determine, for each of players 130-1, 130-2, 130-3, ..., 130-$n$ and for each of the predetermined number of time slots, a representative attribute as on-line if the quantity of days with on-line attribute is higher than a predetermined threshold, while as off-line otherwise. By way of example, but not limitation, if the quantity of days with on-line attribute for a certain time slot is, for example, at least 15 days per 30 days, at least 18 days per 30 days, or at least 20 days per 30 days, etc., game server 100 may determine the representative attribute as on-line.

In some embodiments, game server 100 may generate a time slot table for each of the players 130-1, 130-2, 130-3, ..., 130-$n$ based at least in part on the determined representative attributes for each of players 130-1, 130-2, 130-3, ..., 130-$n$. An example process for generating the time slot table will be described in more detail with reference to FIG. 2, which schematically shows an illustrative example of a process for generating a time slot table for a player, arranged in accordance with at least some embodiments described herein.

Figure 2:
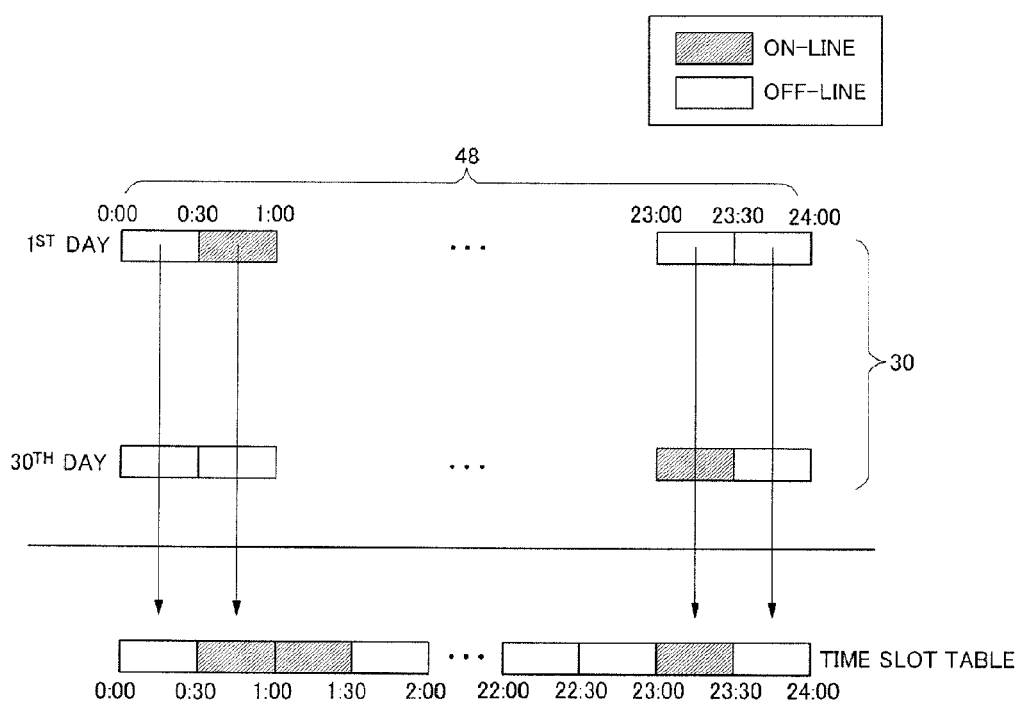
FIG. 2 schematically shows an illustrative example of a process for generating a time slot table for a player, arranged in accordance with at least some embodiments described herein.

As depicted in FIG. 2, a game server (e.g., game server 100) may analyze an access pattern of a player on a 48-time-slot-per-day (i.e., the length of each time slot is 30 minutes) and 30-day-period basis. Although FIG. 2 illustrates that the game server analyzes the access pattern on a 48-time-slot-per-day and 30-day-period basis, one skilled in the art will appreciate that any number of time slots and/or any length of period may be employed.

In some embodiments, the game server may determine an attribute, i.e., whether the player accessed the game server or not, for each of the 48 time slots and for each of the 30 days. By way of example, but not limitation, game server 100 may determine the attribute for a certain time slot as on-line if the player accesses the game server for, for example, at least 15 minutes per 30 minutes, at least 18 minutes per 30 minutes, or at least 20 minutes per 30 minutes, etc.; and game server 100 may determine the attribute as off-line otherwise.

Then, in some embodiments, the game server may determine a representative attribute for the 30-day period for each of the 48 time slots. In some embodiments, the game server may determine the representative attribute for the certain time slot as on-line if the quantity of days with on-line attribute is higher than a predetermined threshold; and the game server may determine the representative attribute for the certain time slot as off-line otherwise.

By way of example, but not limitation, if the quantity of days with on-line attribute for the certain time slot is, for example, at least 15 days per 30 days, at least 18 days per 30 days, or at least 20 days per 30 days, etc., game server 100 may determine the representative attribute as on-line. For instance, in the example illustrated in FIG. 2, the game server may determine the representative attribute for time slots 0:00 to 0:30, 1:30 to 2:00, ..., 22:00 to 22:30, 22:30 to 23:00, and 23:30 to 24:00 as off-line when it is determined that the quantity of days with on-line attribute for each of the corresponding time slot is lower than or equal to the predetermined threshold, while determine the representative attribute for time slots 0:30 to 1:00, 1:00 to 1:30, . . . , and 23:00 to 23:30 as on-line when it is determined that the quantity of days with on-line attribute for each of the corresponding time slot is higher than the predetermined threshold.

Then, in some embodiments, the game server may generate the time slot table based at least in part on the determined representative attributes for the 48 time slots.

Referring to FIG. 1 again, in some embodiments, game server 100 may compare a time slot table for one player (e.g., player 130-1) with time slot tables for the other players (e.g., players 130-2, 130-3, . . . , 130-n). In some embodiments, game server 100 may recommend to player 130-1 at least some of players 130-2, 130-3, . . . , 130-n in order of similarity between the time slot table for player 130-1 and the time slot tables for players 130-2, 130-3, . . . , 130-n, for a long-term player matching. In some alternative embodiments, for a short-term player matching, game server 100 may calculate an estimate of remaining playing time for each of players 130-1, 130-2, 130-3, . . . , 130-n accessing game server 100 from the time of receiving a one-time matching request from player 130-1, based at least in part on the time slot table for each of players 130-1, 130-2, 130-3, . . . , 130-n. Then, game server 100 may recommend to player 130-1 at least some of players 130-2, 130-3, . . . , 130-n in order of similarity between the estimate of remaining playing time for player 130-1 and the estimates of remaining playing times for players 130-2, 130-3, . . . , 130-n. In some embodiments, game server 100 may recommend to player 130-1 at least some of players 130-2, 130-3, . . . , 130-n by further taking into consideration additional information such as, for example, a level and/or rank in the game of each of players 130-1, 130-2, 130-3, . . . , 130-n.

Figure 3:
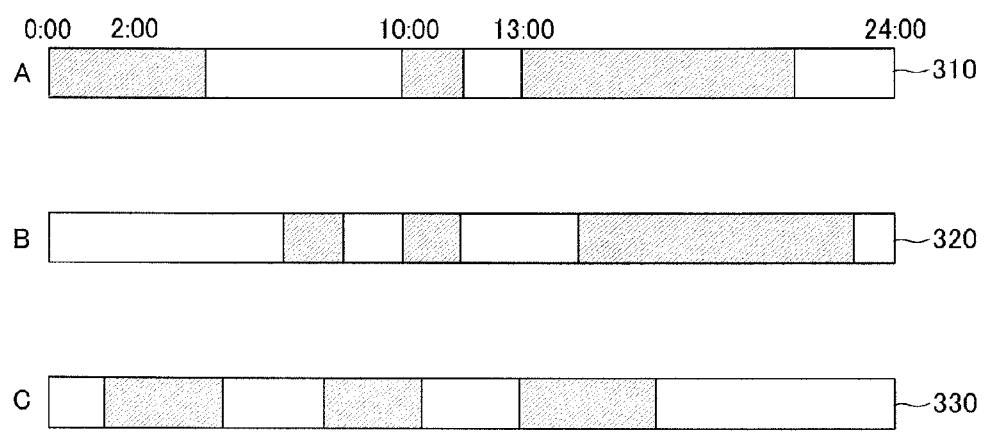
FIG. 3 schematically shows an illustrative example of time slot tables for multiple players, arranged in accordance with at least some embodiments described herein.

FIG. 3 schematically shows an illustrative example of time slot tables for multiple players, arranged in accordance with at least some embodiments described herein. That is, FIG. 3 depicts an example process for determining other compatible players with him to play a game.

In the example illustrated in FIG. 3, time slot tables 310, 320 and 330 may be generated for players A, B and C, respectively, in accordance with some embodiments described above with respect to FIGS. 1-2. In some embodiments, the game server may recommend to player A at least one other compatible player who can continue playing a game together in a long-term basis. In such cases, the game server may recommend to player A at least one other compatible player in order of the longest overlapped time slots in the time slot tables. In the example illustrated in FIG. 3, for player A, who plays a game for a long time after 13:00, player B (whose time slots are overlapped most with those of player A after 13:00) may be recommended first.

In some embodiments, game server 100 may recommend to player A at least one other compatible player who can play the game together in a short-term basis. In the example illustrated in FIG. 3, at 2:00, player C, who has a similar expected remaining playing time, may be recommended first to player A for a multiplayer game. Meanwhile, at 10:00, player B, who has a similar expected remaining playing time, may be recommended first to player A for a multiplayer game.

As such, game server 100 may recommend to one player one or more other compatible players with whom to play the game, both in a long-term basis and in a short-term basis.

Figure 4:
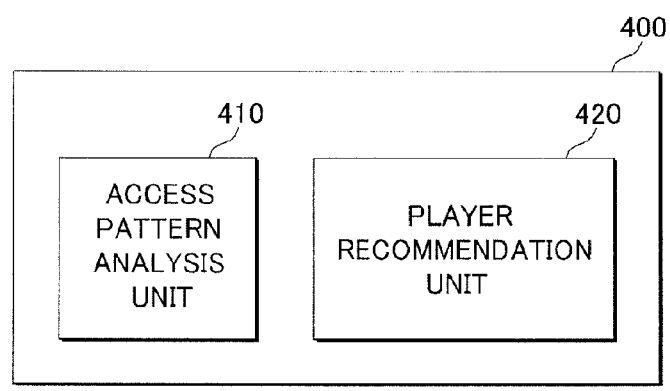
FIG. 4 shows a schematic block diagram illustrating an example architecture for providing a player matching scheme for a game system, arranged in accordance with at least some embodiments described herein.

FIG. 4 shows a schematic block diagram illustrating an example architecture for providing a player matching scheme for a game system, arranged in accordance with at least some embodiments described herein.

As depicted, a player matching system 400 may include an access pattern analysis unit 410 and a player recommendation unit 420. Although illustrated as discrete components, various components may be divided into additional components, combined into fewer components, or eliminated altogether while being contemplated within the scope of the disclosed subject matter.

Access pattern analysis unit 410 may be configured to analyze access patterns of multiple players (e.g., players 130-1, 130-2, 130-3, . . . , 130-n of FIG. 1) of a game provided by a game server (e.g., game server 100 of FIG. 1). In some embodiments, access pattern analysis unit 410 may identify when each of the players accesses the game server and/or for how long each of the players accesses the game server, and analyze the access patterns based thereon. In some embodiments, access pattern analysis unit 410 may analyze the access patterns based at least in part on access log data for each of the players.

Player recommendation unit 420 may be configured to recommend to one player of the multiple players at least some others of the multiple players with whom the one player can compatibly play the game, based at least in part on the access patterns analyzed by access pattern analysis unit 410. In some embodiments, player recommendation unit 420 may recommend to the one player at least some of the others of the multiple players in order of similarity between the access pattern of the one player and the access pattern of each of the others of the multiple players. In some alternative embodiments, player recommendation unit 420 may recommend to a group of players of the multiple players at least some others of the multiple players with whom the players in the group can compatibly play the game, based at least in part on the access pattern of each of the players in the group and the access pattern of each of the others of the multiple players.

In some embodiments, access pattern analysis unit 410 may determine an attribute for each of the multiple players and for each of a predetermined number of time slots, based at least in part on which of the predetermined number of time slots each of the multiple players accesses the game server.

By way of example, but not limitation, access pattern analysis unit 410 may determine, for each of the multiple players and for each of the predetermined number of time slots, the attribute as on-line if the corresponding player accesses the game server longer than a predetermined portion of the length of the time slot while access pattern analysis unit 410 may determine the attribute as off-line otherwise. By way of example, but not limitation, when the length of each time slot is 30 minutes, access pattern analysis unit 410 may determine the attribute as on-line if the corresponding player accesses the game server for longer than, for example, 15 minutes, 18 minutes, or 20 minutes, etc.; while access pattern analysis unit 410 may determine the attribute as off-line otherwise.

In some embodiments, access pattern analysis unit 410 may calculate, for each of the multiple players and for each of the predetermined number of time slots, a quantity of predetermined days having an on-line attribute, and determine a representative attribute as on-line if the quantity of days with on-line attribute is higher than a predetermined threshold or determine the representative attribute as off-line if the quantity of days with on-line attribute is equal to or lower than the predetermined threshold. By way of example, but not limitation, if the quantity of days with on-line attribute for a certain time slot is, for example, at least 15 days per 30 days, at least 18 days per 30 days, or at least 20 days per 30 days, etc., access pattern analysis unit 410 may determine the representative attribute as on-line.

In some embodiments, based at least in part on the determined representative attributes for each of the players, access pattern analysis unit 410 may generate a time slot table for each of the players.

In some embodiments, player recommendation unit 420 may compare the time slot table for the one player with the time slot tables for the others of the multiple players, which may be generated by access pattern analysis unit 410. Then, in some embodiments, player recommendation unit 420 may recommend to the one player at least some of the others in order of similarity between the time slot table for the one player and the time slot tables for the others.

In some embodiments, when game server receives a one-time matching request from the one player, player recommendation unit 420 may calculate estimates of remaining playing times for the multiple players accessing the game server from the time of receiving the one-time matching request. In some embodiments, player recommendation unit 420 may calculate the estimates of remaining playing times based at least in part on the time slot table for each of the players. Then, in some embodiments, player recommendation unit 420 may recommend to the one player at least some of the other players in order of similarity between the estimate of remaining playing time for the one player and the estimates of remaining playing times for the other players.

In some embodiments, player matching system 400 may further include a memory (not shown). In some embodiments, the memory may be configured to store the access patterns analyzed by access pattern analysis unit 410.

As such, the game server may recommend to one player one or more other compatible players with whom to play the game, both in a long-term basis and in a short-term basis.

Figure 5:
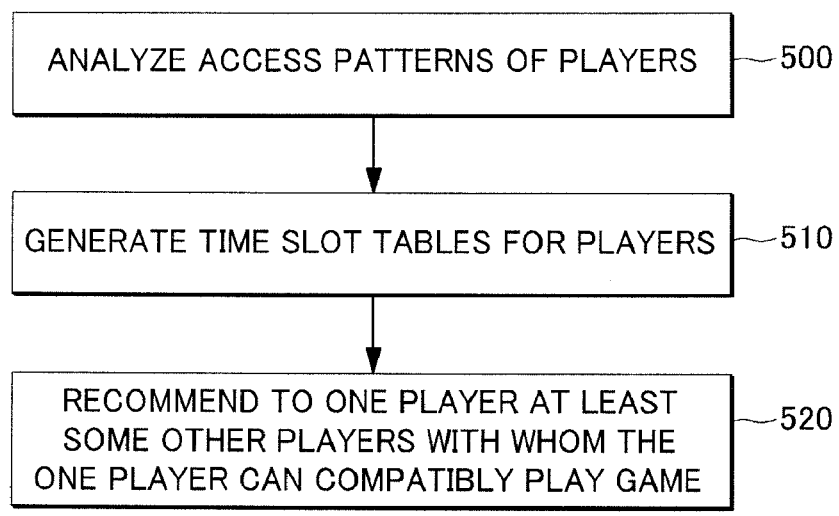
FIG. 5 shows an example flow diagram of a process for providing a player matching scheme for a game system, arranged in accordance with at least some embodiments described herein.

FIG. 5 shows an example flow diagram of a process for providing a player matching scheme for a game system, arranged in accordance with at least some embodiments described herein.

The process in FIG. 5 may be implemented in a game server such as game server 100 and/or a player matching system such as player matching system 400 including access pattern analysis unit 410 and player recommendation unit 420 described above. An example process may include one or more operations, actions, or functions as illustrated by one or more blocks 500, 510 and/or 520. Although illustrated as discrete blocks, various blocks may be divided into additional blocks, combined into fewer blocks, or eliminated, depending on the desired implementation. Processing may begin at block 500.

At block 500, the game server or the player matching system may analyze access patterns of multiple players playing a game provided by the game server. In some embodiments, the game server or the player matching system may identify when each of the players accesses the game server and/or for how long each of the players accesses the game server. In some embodiments, the game server or the player matching system may analyze the access patterns based at least in part on access log data for each of the players. Processing may continue from block 500 to block 510.

At block 510, the game server or the player matching system may generate time slot tables for the multiple players. In some embodiments, the game server or the player matching system may generate the time slot tables based at least in part on the analyzed access patterns of the players. By way of example, but not limitation, the game server or the player matching system may generate the time slot tables in accordance with some embodiments described above with respect to FIG. 2. Processing may continue from block 510 to block 520.

At block 520, the game server or the player matching system may recommend to one player of the multiple players at least some others of the multiple players with whom the one player can compatibly play the game.

In some embodiments, the game server or the player matching system may compare the time slot table for the one player with time slot tables for the others of the multiple players, and recommend to the one player at least some of the others of the multiple players in order of similarity between the time slot table for the one player and the time slot tables for the others.

In some alternative embodiments, the game server or the player matching system may calculate an estimate of remaining playing time for each of the multiple players, based at least in part on the time slot tables, from the time of receiving a one-time matching request from the one player, and recommend to the one player at least some of the others of the multiple players in order of similarity between the estimate of remaining playing time for the one player and the estimates of remaining playing times for the others.

As such, the game server or the player matching system may recommend to one player one or more other compatible players with whom to play the game, both in a long-term basis and in a short-term basis.

One skilled in the art will appreciate that, for this and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments.

Figure 6:
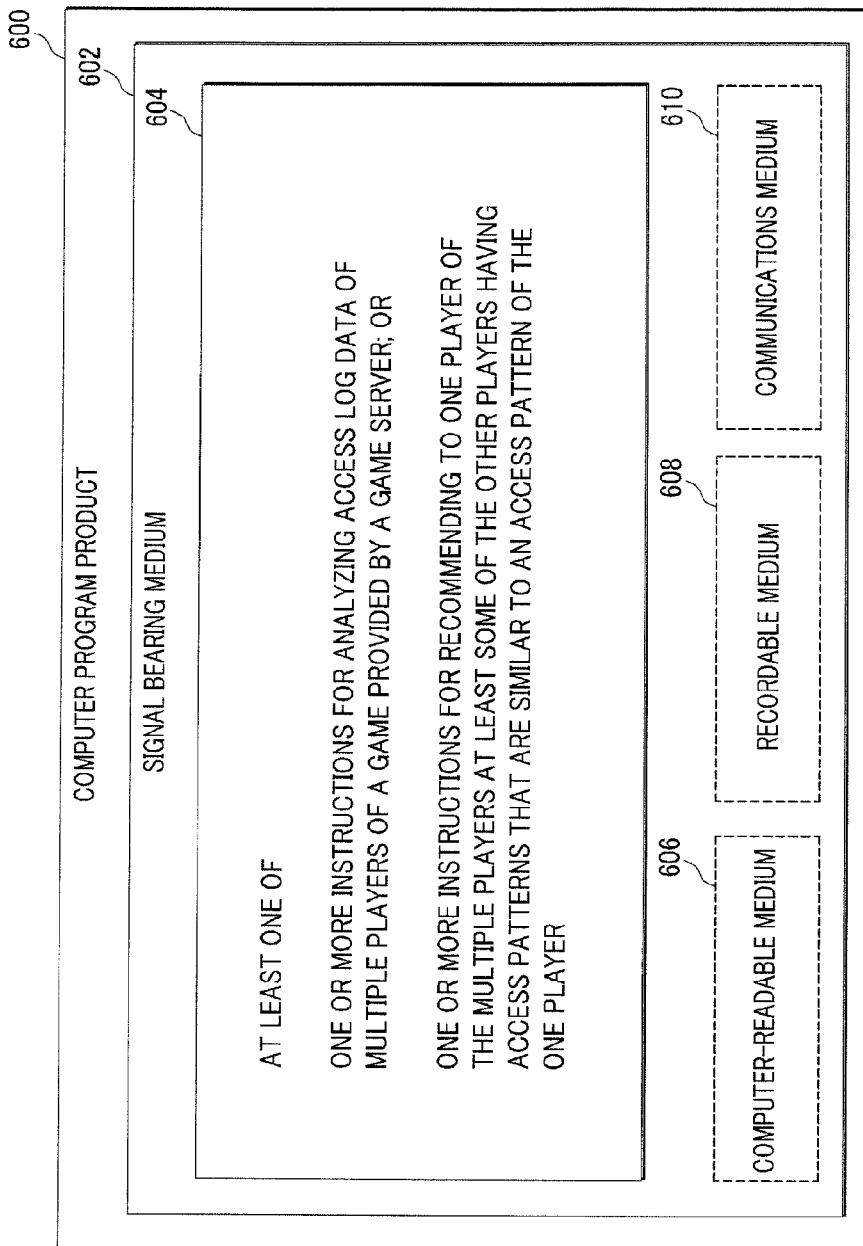
FIG. 6 illustrates example computer program products that may be utilized to provide a player matching scheme for a game system, arranged in accordance with at least some embodiments described herein.

FIG. 6 illustrates example computer program products that may be utilized to provide a player matching scheme for a game system, arranged in accordance with at least some embodiments described herein.

Program product 600 may include a signal bearing medium 602. Signal bearing medium 602 may include one or more instructions 604 that, when executed by, for example, a processor, may provide the functionality described above with respect to FIGS. 1-5. By way of example, instructions 604 may include: one or more instructions for analyzing access log data of multiple players of a game provided by a game server; one or more instructions for recommending to one player of the multiple players at least some of the other players having access patterns that are similar to an access pattern of the one player. Thus, for example, referring to FIG. 4, player matching system 400 may undertake one or more of the blocks shown in FIG. 5 in response to instructions 604.

In some implementations, signal bearing medium 602 may encompass a computer-readable medium 606, such as, but not limited to, a hard disk drive, a CD, a DVD, a digital tape, memory, etc. In some implementations, signal bearing medium 602 may encompass a recordable medium 608, such as, but not limited to, memory, read/write (R/W) CDs, R/W DVDs, etc. In some implementations, signal bearing medium 602 may encompass a communications medium 610, such as, but not limited to, a digital and/or an analog communication medium (e.g., a fiber optic cable, a waveguide, a wired communications link, a wireless communication link, etc.). Thus, for example, program product 600 may be conveyed to one or more modules of player matching system 400 by an RF signal bearing medium 602, where the signal bearing medium 602 is conveyed by a wireless communications medium 610 (e.g., a wireless communications medium conforming with the IEEE 802.11 standard).

Figure 7:
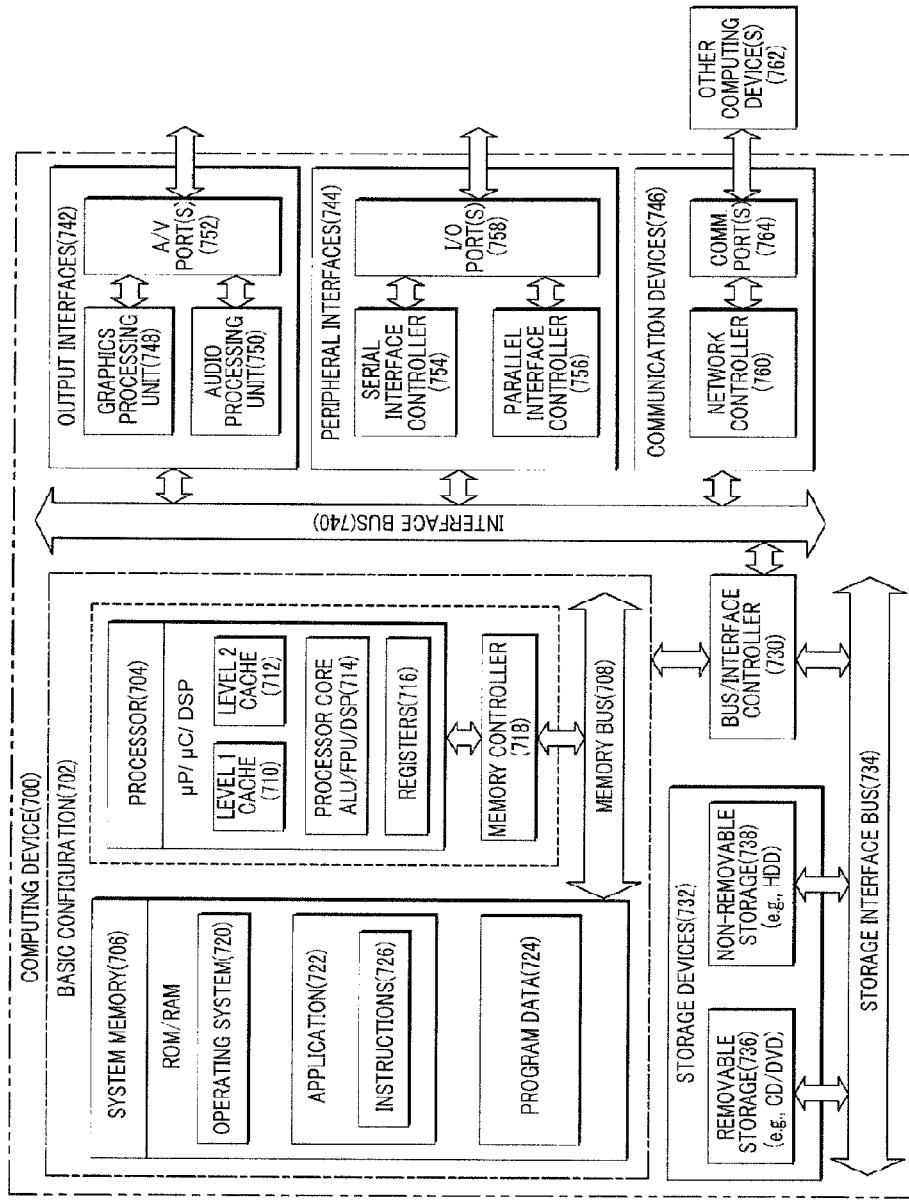
FIG. 7 is a block diagram illustrating an example computing device that may be utilized to provide a player matching scheme for a game system, arranged in accordance with at least some embodiments described herein.

FIG. 7 is a block diagram illustrating an example computing device that may be utilized to provide a player matching scheme for a game system, arranged in accordance with at least some embodiments described herein.

In these examples, elements of computing device 700 may be arranged or configured for a game system. In a very basic configuration 702, computing device 700 typically includes one or more processors 704 and a system memory 706. A memory bus 708 may be used for communicating between processor 704 and system memory 706.

Depending on the desired configuration, processor 704 may be of any type including but not limited to a microprocessor (µP), a microcontroller C), a digital signal processor (DSP), or any combination thereof. Processor 704 may include one more levels of caching, such as a level one cache 710 and a level two cache 712, a processor core 714, and registers 716. An example processor core 714 may include an arithmetic logic unit (ALU), a floating point unit (FPU), a digital signal processing core (DSP Core), or any combination thereof. An example memory controller 718 may also be used with processor 704, or in some implementations memory controller 718 may be an internal part of processor 704.

Depending on the desired configuration, system memory 706 may be of any type including but not limited to volatile memory (such as RAM), nonvolatile memory (such as ROM, flash memory, etc.) or any combination thereof. System memory 706 may include an operating system 720, one or more applications 722, and program data 724. Application 722 may include instructions 726 that may be arranged to perform the functions as described herein including the actions described with respect to the player matching system 400 architecture as shown in FIG. 4 or including the actions described with respect to the flow charts shown in FIG. 5. In some examples, application 722 may be arranged to operate with program data 724 on an operating system 720 such that implementations for instructions for a player matching system as described herein.

Computing device 700 may have additional features or functionality, and additional interfaces to facilitate communications between basic configuration 702 and any required devices and interfaces. For example, a bus/interface controller 730 may be used to facilitate communications between basic configuration 702 and one or more data storage devices 732 via a storage interface bus 734. Data storage devices 732 may be removable storage devices 736, non-removable storage devices 738, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media may include volatile and nonvolatile, removable and non-removable media implemented in any method or technology for storage of information, such as computer readable instructions, data structures, program modules, or other data.

System memory 706, removable storage devices 736 and non-removable storage devices 738 are examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by computing device 700. Any such computer storage media may be part of computing device 700.

Computing device 700 may also include an interface bus 740 for facilitating communication from various interface devices (e.g., output devices 742, peripheral interfaces 744, and communication devices 746) to basic configuration 702 via bus/interface controller 730. Example output devices 742 include a graphics processing unit 748 and an audio processing unit 750, which may be configured to communicate to various external devices such as a display or speakers via one or more A/V ports 752. Example peripheral interfaces 744 include a serial interface controller 754 or a parallel interface controller 756, which may be configured to communicate with external devices such as input devices (e.g., keyboard, mouse, pen, voice input device, touch input device, etc.) or other peripheral devices (e.g., printer, scanner, etc.) via one or more I/O ports 758. An example communication device 746 includes a network controller 760, which may be arranged to facilitate communications with one or more other computing devices 762 over a network communication link via one or more communication ports 764.

The network communication link may be one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

Computing device 700 may be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. Computing device 700 may also be implemented as a personal computer including both laptop computer and non-laptop computer configurations.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds, compositions or biological systems, which can, of course, vary. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

What is claimed is:

1. A player matching system comprising:
   an access pattern analysis unit configured to:
      analyze access patterns of a plurality of players of a game provided by at least one game server,
      divide one day into a predetermined number of time slots, and
      determine whether each of the plurality of players accesses the at least one game server for respective time slots; and
   a player recommendation unit configured to recommend to one player of the plurality of players at least some others of the plurality of players with whom the one player can compatibly play the game, based at least in part on the analyzed access patterns, and in order of similarity between the analyzed access pattern of the one player and the analyzed access pattern of each of the others of the plurality of players.

2. The player matching system of claim 1, wherein the access pattern analysis unit is further configured to identify at least one of when the each of the plurality of players accesses the at least one game server and for how long the each of the plurality of players accesses the at least one game server.

3. The player matching system of claim 1, wherein the access pattern analysis unit is further configured to analyze the access patterns of the plurality of players based at least in part on access log data for the each of the plurality of players.

4. The player matching system of claim 1, wherein the access pattern analysis unit is further configured to determine an attribute for the each of the plurality of players and for the each of the predetermined number of time slots based at least in part on which of the predetermined number of time slots the each of the plurality of players the accesses the at least one game server, and
   wherein the attribute for the each of the plurality of players and for the each of the predetermined number of time slots is either on-line or off-line.

5. The player matching system of claim 4, wherein the access pattern analysis unit is further configured to:
   calculate, for the each of the plurality of players and for the each of the predetermined number of time slots, a quantity of predetermined days having an on-line attribute; and
   determine, for the each of the plurality of players and for the each of the predetermined number of time slots, a representative attribute as on-line if the quantity of days with on-line attribute is higher than a predetermined threshold or as off-line if the quantity of days with on-line attribute is equal to or lower than the predetermined threshold.

6. The player matching system of claim 5, wherein the access pattern analysis unit is further configured to generate a time slot table for the each of the plurality of players based at least in part on the determined representative attributes for the each of the plurality of players.

7. The player matching system of claim 6, wherein the player recommendation unit is further configured to:
compare a time slot table for the one player with time slot tables for the others of the plurality of players; and
recommend to the one player the at least some of the others of the plurality of players in order of similarity between the time slot table for the one player and the time slot tables for the others of the plurality of players.

8. The player matching system of claim 6, wherein the player recommendation unit is further configured to:
calculate an estimate of remaining playing time for the each of the plurality of players accessing the at least one game server from the time of receiving a one-time matching request from the one player, based at least in part on the time slot table for the each of the plurality of players; and
recommend the at least some of the others of the plurality of players in order of similarity between the estimate of remaining playing time for the one player and the estimates of remaining playing times for the others of the plurality of players.

9. The player matching system of claim 1, further comprising:
a memory configured to store the analyzed access patterns of the plurality of players.

10. A method performed under control of at least one game server, comprising:
analyzing an access pattern of a player playing a game provided by at least one game server by:
dividing one day into a predetermined number of time slots, and
determining whether the player accesses the at least one game server for one of the time slots; and
recommending to the player one or more other compatible players with whom to play the game, based at least in part on the access pattern of the player and access patterns of the one or more other players, and in order of similarity between the access pattern of the player and the access pattern of each of the one or more other players.

11. The method of claim 10, wherein the analyzing the access pattern of the player includes identifying at least one of when the player accesses the at least one game server and for how long the player accesses the at least one game server.

12. The method of claim 10, wherein the analyzing the access pattern of the player includes analyzing the access pattern of the player based at least in part on access log data of the player.

13. The method of claim 10, wherein the analyzing the access pattern of the player further includes:
determining an attribute for the one of the time slots based at least in part on whether the player accesses the at least one game server for the one of the time slots, wherein the attribute for the one of the time slots is either on-line or off-line;
calculating, for the one of the time slots during a span of predetermined days, a quantity of days with the on-line attribute; and
determining, for the one of the time slots, a representative attribute as on-line if the quantity of days with on-line attribute is higher than a predetermined threshold and as off-line if the quantity of days with on-line attribute is equal to or lower than the predetermined threshold.

14. The method of claim 13, wherein the analyzing the access pattern of the player further includes:
generating a time slot table for the player based at least in part on the determined representative attribute for the one of the time slots.

15. The method of claim 14, wherein the recommending the one or more other players includes:
comparing the time slot table for the player with time slot tables for the one or more other players; and
recommending the one or more other players in order of similarity between the time slot table for the player and the time slot tables for the one or more other players.

16. The method of claim 14, wherein the recommending the one or more other players includes:
calculating an estimate of remaining playing time for the player from the time of receiving one-time matching request, based at least in part on the time slot table for the player;
calculating each estimate of remaining playing time for each of the one or more other players accessing the at least one game server from the time of receiving the one-time matching request, based at least in part on the time slot table for the each of the one or more other players; and
recommending the one or more other players in order of similarity between the estimate of remaining playing time for the player and the estimates of remaining playing times for the one or more other players.

17. The method of claim 10, wherein the analyzing the access pattern of the player further includes determining an attribute for the one of the time slots, and determining the attribute of the one of the time slots as on-line if the player accesses the at least one game server longer than a predetermined portion of a length of the one of time slots.

18. A non-transitory computer-readable storage medium having stored thereon computer-executable instructions that, in response to execution by at least one processor based device, cause a player matching system to perform operations, comprising:
analyzing access log data of a plurality of players of a game provided by at least one game server by;
dividing one day into a predetermined number of time slots, and
determining whether each of the plurality of players accesses the at least one game server for respective time slots; and
recommending to one player of the plurality of players at least some of the other players having access patterns that are similar to an access pattern of the one player, and in order of similarity between the access pattern of the one player and the access pattern of each of the other players.

19. The non-transitory computer-readable storage medium of claim 18, wherein the operations further comprises:
calculating respective similarities between the access pattern of the one player and the respective access patterns of the other players; and
providing the one player with a list of the at least some of the other players based at least in part on the calculated similarities.

* * * * *

UNITED STATES PATENT AND TRADEMARK OFFICE
CERTIFICATE OF CORRECTION

PATENT NO. : 9,132,350 B2  
APPLICATION NO. : 13/697243  
DATED : September 15, 2015  
INVENTOR(S) : Kim et al.

Page 1 of 1

It is certified that error appears in the above-identified patent and that said Letters Patent is hereby corrected as shown below:

In The Specification

In Column 1, Line 7, delete "§371" and insert -- § 371 --, therefor.

In Column 3, Line 53, delete "130n." and insert -- 130-n. --, therefor.

In Column 9, Line 16, delete "C)," and insert -- μC), --, therefor.

In The Claims

In Column 12, Line 53, in Claim 4, delete "players the" and insert -- players --, therefor.

In Column 14, Line 46, in Claim 18, delete "server by;" and insert -- server by: --, therefor.

Signed and Sealed this
First Day of March, 2016

Michelle K. Lee
*Director of the United States Patent and Trademark Office*